United States Patent
Oleske

(10) Patent No.: US 10,166,736 B2
(45) Date of Patent: Jan. 1, 2019

(54) SAG-RESISTANT SUBSTRATES AND METHODS OF PREPARING AND USING SAME

(71) Applicant: ARMSTRONG WORLD INDUSTRIES, INC., Lancaster, PA (US)

(72) Inventor: Peter J. Oleske, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 103 days.

(21) Appl. No.: 15/324,757

(22) PCT Filed: Jul. 9, 2014

(86) PCT No.: PCT/US2014/045863
§ 371 (c)(1),
(2) Date: Jan. 9, 2017

(87) PCT Pub. No.: WO2016/007148
PCT Pub. Date: Jan. 14, 2016

(65) Prior Publication Data
US 2017/0203535 A1     Jul. 20, 2017

(51) Int. Cl.
| | | |
|---|---|---|
| C08G 63/02 | (2006.01) | |
| B32B 3/12 | (2006.01) | |
| B32B 5/02 | (2006.01) | |
| B32B 7/02 | (2006.01) | |
| B32B 7/12 | (2006.01) | |
| E04F 13/12 | (2006.01) | |
| E04F 13/16 | (2006.01) | |
| E04F 13/18 | (2006.01) | |

(52) U.S. Cl.
CPC ............ *B32B 3/12* (2013.01); *B32B 5/022* (2013.01); *B32B 5/024* (2013.01); *B32B 5/028* (2013.01); *B32B 7/02* (2013.01); *B32B 7/12* (2013.01); *E04F 13/12* (2013.01); *E04F 13/16* (2013.01); *B32B 2262/101* (2013.01); *B32B 2307/548* (2013.01); *B32B 2607/00* (2013.01); *E04F 13/18* (2013.01)

(58) Field of Classification Search
USPC .......................................... 428/116, 148, 220
See application file for complete search history.

(56) References Cited

U.S. PATENT DOCUMENTS

| | | |
|---|---|---|
| 3,970,502 A | 7/1976 | Turner |
| 2006/0062955 A1 | 3/2006 | Liu et al. |
| 2006/0083892 A1 | 4/2006 | Wang et al. |
| 2006/0189236 A1 | 8/2006 | Davis et al. |
| 2012/0040204 A1 | 2/2012 | Lyubomirskiy |

FOREIGN PATENT DOCUMENTS

| | | |
|---|---|---|
| CN | 2185674 Y | 12/1994 |
| CN | 1180121 A | 4/1998 |
| CN | 101470228 A | 7/2009 |
| RU | 2027555 C1 | 1/1995 |
| RU | 2350479 C1 | 3/2009 |
| RU | 90468 U1 | 1/2010 |
| RU | 139061 U1 | 4/2014 |
| RU | 2516143 A | 5/2014 |
| WO | 1996013377 | 5/1996 |
| WO | 2004057127 A1 | 7/2004 |

OTHER PUBLICATIONS

Corresponding CN Search Report for Corresponding Application No. 2014800804519, dated May 4, 2018. CN.
Corresponding RU Search Report for Corresponding Application No. 2017104122, dated Mar. 30, 2018. RU.
Corresponding PCT Search Report for PCT/US2014/045863, dated Sep. 9, 2014. WO.
Search Report for Corresponding AU Application No. 2014400671, dated Jul. 17, 2018. AU.

*Primary Examiner* — Terressa Boykin
(74) *Attorney, Agent, or Firm* — Craig M. Sterner

(57) ABSTRACT

Described herein are substrates comprising: a core comprising a plurality of open cells; a first facing layer attached to a first major side of the core by a first adhesive; and a second facing layer attached to a second major side of the core by a second adhesive; wherein the glass transition temperature of the second adhesive is greater than the glass transition temperature of the first adhesive.

20 Claims, No Drawings

SAG-RESISTANT SUBSTRATES AND METHODS OF PREPARING AND USING SAME

CROSS-REFERENCE TO RELATED APPLICATIONS

This application is a U.S. national stage application under 35 U.S.C. § 371 of PCT Application No. PCT/US2014/045863, filed Jul. 9, 2014, the entirety of which is incorporated herein by reference.

FIELD OF THE DISCLOSURE

The present disclosure relates to sag-resistant structures, and more particularly to light-weight sag-resistant structures that are fracture resilient.

BACKGROUND

Substrates are used in a variety of applications inside a building structure to create aesthetically pleasing room environments. The substrates may be formed into panels that can be applied to the walls, ceilings (in some instances forming a suspended ceiling system), and canopies. In some applications panels may be self-supporting; however, such panels may sometimes be heavy and require complex constructions that lead to a visibly apparent deflection (sag) across the substrate. In order for a panel to function effectively as a ceiling panel, it must be able to resist sag (gravity and humidity induced creep) and remain flat. This requires the bond between the flanges and the web (surfaces and core) to remain stable across a range of temperatures, humidity and mechanical stresses. Hard set adhesives, though dimensionally stable, are brittle and the bonds may be easily broken if the panel is flexed or bumped. In contrast, soft set adhesives are resilient and enable panels to be flexed without breaking the bonds, but are susceptible to creep.

Thus, there is a need for adhesive systems for ceiling systems that provide a combination of dimensional stability and resilience. Embodiments of the present invention are directed to meeting these needs.

SUMMARY

In some embodiments, the present invention provides a light-weight, sag-resistant substrate comprising a core having a plurality of open cells, a first facing layer attached to a first major side of the core by a first adhesive; and a second facing layer attached to a second major side of the core by a second adhesive. In some embodiments, the glass transition temperature of the second adhesive is greater than the glass transition temperature of the first adhesive.

Some embodiments of the present invention also provide a method for producing a light-weight, sag-resistant substrate comprising the steps of: forming a core having a plurality of open cells, forming a first facing layer, forming a second facing layer, and attaching the first facing layer to a first major side of the core using a first adhesive and attaching the second facing layer to a second major side of the core using a second adhesive. In some embodiments, the glass transition temperature of the second adhesive is greater than the glass transition temperature of the first adhesive. In some embodiments, the present invention provides methods of using the substrates described herein in a ceiling system.

DETAILED DESCRIPTION

The features and benefits of the present invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation.

As used herein, terms such as "attached," "affixed," "connected," "coupled," "interconnected," and the like refer to a relationship wherein structures are secured or attached to one another either directly or indirectly through intervening structures, as well as both movable or rigid attachments or relationships, unless expressly described otherwise. Accordingly, the disclosure is not limited to such exemplary embodiments illustrating certain combinations of features that may exist alone or in combination with other features.

In some embodiments, the present invention includes a substrate having multiple layers. In some embodiments, the layers include a core, a first facing layer, and a second facing layer. In some embodiments, the core comprises a first major side and a second major side, the first major side being opposite to the second major side. In some embodiments, the first major side may be a front side which is exposed to a building space or room environment and the second major side may be a rear side which is concealed from view when the substrate is mounted. In some embodiments, the first facing layer is joined to the first major side of the core with a first adhesive, and the second outer facing layer is joined on the opposite side of the core on the second major side of the core with a second adhesive. Some embodiments provide that the substrate further includes peripheral lateral sides extending all the way around the core which collectively define a perimeter edge of the substrate that in turn defines a length and width. In some embodiments, the perimeter edge may have a square or rectangular edge profile, but other suitable edge profiles may be provided.

In some embodiments, the core may have a plurality of open cells that are defined by cell walls. Some embodiments provide that the cell walls are interconnected and extend vertically in height between the first facing layer and the second facing layer in a direction that is substantially perpendicular to the first and second facing layers. In some embodiments, the cells define openings through the core which extend vertically through the substrate and perpendicular to the first and second facing layers—the vertical orientation of the cell openings (i.e. open on the top and bottom ends of each cell) may provide desirable acoustical noise suppression and structural stiffening of the substrate.

In some embodiments, cell size may be selected to provide a cell width or diameter that ranges from about ¼ inch to 3 inches, alternatively from about ¼ inch to and including 1 inch in diameter (noting that the hexagon-shaped cells approximate a circle in shape and a diameter). In some embodiments, cell diameters beyond the foregoing range are suitable, but less desirable because issues may arise with surface deflection (pillowing), unsupported edge damage, and de-lamination.

Cell heights in some embodiments may be from about and including 0.20 inches to 4 inches, alternatively from ⅜ inch to and including 1.5 inches; alternatively cell heights in the higher range from about 0.8 to 1.25 inches have been tested for sag and provide good sag resistance. In other embodiments, other suitable heights may be used provided the sag resistance is adequate for the given size acoustical panel to be constructed.

In some embodiments the cell height is proportional to the thickness and density of adhesive applied.

In some embodiments, the core forms a substantially open structure based on the three-dimensional total volume of the core delimited by the lateral sidewalls and the major sides of the core. In some embodiments, the open volume of the cells preferably may comprise 90% or more of the total volume occupied by the core. As representative examples, without limitation, the open volume of the cells will account for approximately 99% of the total volume of the core for 1 inch diameter cells, and approximately 98% for ½ inch diameter cells.

In some embodiments, the cell walls define a circular or polygon shape (e.g. triangular, rectangular, trapezoidal, pentagonal, heptagonal, hexagonal (i.e. "honeycomb"), and the like) for each cell opening. Some embodiments provide that core configurations other than a hexagon-shaped honeycomb structure (in transverse cross section to the vertical direction). For example, some embodiments provide a core having a corrugated construction that may be formed of multiple "W-shaped" sinusoidal curved or undulating cell walls sandwiched and bonded between alternating rows of longitudinally extending straight cell walls.

In some embodiments, the cell walls, which define the core, may be formed from any number of thin, light, and porous or non-porous materials. Some embodiments include the cores that may be formed of cellulosic materials, polymeric materials, or metallic materials. In some embodiments, the cellulosic materials include paper, such as 20 to 80 pound Kraft paper (thicknesses of about 0.004 to 0.015 inches), which may be considered economical and cost-effective as a core cell wall material depending on the application.

In some embodiments, polymeric material may be thermoplastic or thermoset and include polyolefin (e.g. polyethylene "PE", polypropylene "PP"), polyester (e.g. polyethylene terephthalate "PET"), polyamide, acrylic polymers, vinyl polymers, and polyurethane. Some embodiments provide that polymeric material may be reinforced with materials, for example glass fiber (e.g. light weight fiberglass). Some embodiments provide that the core may be formed from metallic materials such as thin aluminum sheet. In some embodiments, heavy gage material (of any type) may be easier to work with, but increases weight and cost. Accordingly, in some embodiments, a balance between the requisite thickness, resistance to sag, and these latter factors is appropriate when selecting the material for cell walls of the core.

In some embodiments, the first and second facing layers may each comprise one or more intermediate and/or exterior layers. In some embodiments, the first facing layer may be exposed to a building space or room environment and the second facing layer may be concealed from view when the substrate is mounted.

Some embodiments provide that the first and second facing layer may each be formed from a cellulosic material, a polymeric material, or a metallic material. In some embodiments, the first and the second layers impart a smooth visual appearance, durability, and dimensional stability while maintaining an appropriate acoustical porosity. Some embodiments provide that the first and the second facing layers may have representative thicknesses ranging from about and including 0.008 to 0.050 inches depending on considerations such as cost, weight, and others, alternatively the thickness may nominally be about 0.030 inches. In some embodiments, the first and second facing layers may have a weight that ranges from about 30 to 150 grams/m², may have tensile strengths greater than 150 N/50mm, and may be made using fibers with a nominal diameter of 10 µm.

For first and second facing layers formed from a polymeric sheet or film, the polymeric material may be selected from a polyolefin, polyurethane, polyester, or polyamide. In some embodiments, low cost first and second facing layers may be produced using polymeric layers made of a polyolefin, such as PE, or PP. The polymeric materials may also comprise polyurethane, polyester, vinyl polymers, and may be reinforced with glass fibers (short or continuous) to increase the mechanical properties of the panels, in particular the bending strength and stiffness, as well as the impact resistance—i.e. fiberglass. In some embodiments, the reinforced polymer may be laminated non-woven glass fibers in a resin matrix or a polymeric sheet or film.

In other embodiments, the first and/or second facing layer may be formed from cellulosic, natural, or man-made organic fibers, woven glass, glass/organic fiber combinations, inorganic fibers such as rockwool, and other fabric like materials. In further embodiments, the exposed surfaces of the first and second outer facing layers may be coated or painted in accordance with U.S. Pat. No. 5,888,626, which is incorporated herein by reference in its entirety, with a high solids acrylic latex paint coating having a sufficiently porous composition to achieve a predetermined airflow resistance. Some embodiments provide that the first facing layer and/or the second facing layer may be formed from metallic materials such as thin aluminum sheet.

In another embodiment, the first and/or second facing layer may be a scrim that is formed via a spunbond process, a melt-blown process, a spunlaced process, a carding process or a combination of any of these processes, such as, for example, spunbond-melt-blown-spunbond or spunbond-meltblown-meltblown-spunbond. In some embodiments, useful materials for producing the scrim include polyester, such as, for example, polyethylene terephthalate, polytrimethylene terephthalate and so forth, polyolefin, such as, for example, polyethylene, polypropylene and so forth, polylactic acid, nylon or a combination of these materials. While the scrim can have a basis weight of from about 8 gsm to about 200 gsm, it may be desirable for the scrim to have a basis weight of from about 8 gsm to about 100 gsm, more desirable, from about 8 gsm to about 75 gsm, or it may be preferable that the scrim has a basis weight of from about 8 gsm to about 50 gsm, or even from about 8 gsm to about 25 gsm.

In other embodiments, additional layers may be applied to the exterior of the first and second facing layers such that the additional exterior layers are in contact with the outwardly facing surface of the first and/or second facing layer. In some embodiments, the additional layer can be made of vermiculite—as discussed in U.S. Pat. No. 4,043,862, herein incorporated by reference in its entirety. Other embodiments provide that additional layers may include a metallic layer like (stainless) steel or aluminum to help impart additional fire resistance, bending-, impact-, and fixing strength. Some embodiments provide that the same adhesive may be used to fix the additional layers as was used to fix each respective first facing layer and the second facing layer to the core.

In some embodiments, the first facing layer is attached to the first major surface of the core by a first adhesive and the second facing layer is attached to the second major surface of by a second adhesive. In some embodiments, the glass transition temperature ("Tg") of the second adhesive is greater than the Tg of the first adhesive. In some embodiments the first adhesive may be a low Tg (as discussed herein) thermoplastic polymer and the second adhesive may be a thermoset or a high Tg (as discussed herein) thermoplastic polymer. In some embodiments, Tg may be measured after the polymer composition has been fully or substantially cured—e.g. reacted out of the prepolymer stage, irreversible crosslinking between polymer chains.

In some embodiments, the second adhesive may include a "high Tg" polymer such that the second adhesive exhibits a Tg ranging from about 70° to about 270° C., alternatively from about 100° C. to about 240° C., alternatively from about 115° C. to about 230° C. In some embodiments, the first adhesive may include a "low Tg" polymer such that the first adhesive exhibits a Tg ranging from about (–)40° to about 60° C., alternatively from about (–)20° C. to about 40° C., alternatively from about 0° C. to about 40° C. In some embodiments, the second adhesive may have a Tg that is about 40° C. to about 140° C. greater than the Tg of the first adhesive. In other embodiments, the cured second adhesive may have a Tg that is about 60° C. to about 120° C. greater than the Tg of the first adhesive. In some embodiments, the aforementioned Tg relationship provides unexpected superior sag resistance to the substrate while also maintaining substrate durability.

In some embodiments, high Tg polymers tend to exhibit greater rigidity at room temperature and be less susceptible to viscloselastic creep, which is the rearrangement of polymer chains over time due to an applied stress, thereby causing a macroscopic change in dimensions of the polymer composition. In some embodiments, compositions that exhibit a high Tg have polymer chains that may be considered to be "locked" into place at room temperature. Being able to better withstand polymer chain reorientation under an applied stress allows the high Tg polymer composition to better withstand viscoelastic creep at room temperature. Although beneficial in avoiding viscoelastic creep, the relative immobility of high Tg polymer chains also results in polymer compositions that exhibit relatively high stiffness. High stiffness can be problematic because the polymer chains are "locked" in place, and are therefore unable to sufficiently reorient under a given load causing the polymer chains to fracture. This can translate into high Tg polymer adhesives that are brittle and subject to macroscopic fracture along the bond line of the adhesive.

The polymer chains having a low Tg, however, have polymer chains that are not "locked" in at room temperature, and therefore can more readily reorient/realign under a given load at room temperature. The ability to reorient polymer chains at room temperature allows low Tg polymers to be less brittle and better withstand fracture, thereby resulting in polymeric materials that are more resilient to macroscopic breakage. However, the ability of low Tg polymer chains to more readily realign at room temperature results in a greater susceptibility to viscoelastic creep. Although a low Tg polymer may not fracture when a given load is applied, over time the polymer chains of that low Tg polymeric material will reorient themselves in order to accommodate the applied load—thereby resulting in a macroscopic change in dimension of the polymer, which can result in sag.

In some embodiments, substrate structures that utilize only high Tg polymer adhesives to bond the first and second facing layers may be able to better withstand viscoelastic creep/sag, however, these panels tend to lack the resiliency needed when storing, transporting, and installing substrates, and the first and/or second facing layers may separate from the core. Conversely, substrate structures that utilize only low Tg polymer adhesives may exhibit sufficient resiliency and resistance to fracture upon impact but will sag under their own weight due to viscoelastic creep.

In some embodiments, it has been discovered that for substrates comprising a core, a first facing layer, and a second facing layer, using a combination of low Tg adhesive and high Tg adhesive provides superior sag and fracture resistance when compared to using only low Tg adhesives or only high Tg adhesives. Specifically, Applicant has discovered superior sag and fracture resistance when adhering the first facing layer to the first major surface of the core by a first adhesive that has a low Tg, and adhering the second facing layer the second major surface by a second adhesive that has a high Tg, wherein the first facing surface is configured to be exposed to a building space or room environment and the second facing surface is configured to be concealed from view when the substrate is mounted.

In some embodiments, the second adhesive may comprise a high Tg polymer, including thermoset polymers or at least one high Tg thermoplastic polymer, such that the second adhesive is formulated to have a viscosity, pot life, and glass transition temperature so that the panels described herein can be formed by a roll-coating process whereby the adhesive does not drip or prematurely cure or harden. In some embodiments, the second adhesive may be a latent cure adhesive. In other embodiments, the second adhesive may cure only upon application of heat. In some embodiments, the second adhesive may comprise an epoxy resin, which as used herein, may include any of the conventional dimeric, oligormeric or polymeric epoxy materials containing at least one epoxy functional group.

In some embodiments, the epoxy resin may comprise from about 2% to about 99% by weight of the second adhesive; alternatively from about 15% to about 50% by weight of the second adhesive; alternatively about 15% by weight of the second adhesive. In other embodiments, the epoxy resin may comprise less than about 60% by weight of the second adhesive. Some embodiments provide that the epoxy resin may be a liquid or a solid epoxy resin or may be a combination of liquid and solid epoxy resins.

In some embodiments, the epoxy resins of the present invention may include a wide variety of curable epoxy compounds and combinations thereof—such as epoxy resins which are also referred to as polyepoxides. In some embodiments, the polyepoxides useful herein can be monomeric (e.g., the diglycidyl ether of bisphenol A, diglycidyl ether of bisphenol F, digylcidyl ether of tetrabromobisphenol A, novolac-based epoxy resins, and tris-epoxy resins), higher molecular weight resins (e.g., the diglycidyl ether of bisphenol A advanced with bisphenol A) or polymerized unsaturated monoepoxides (e.g., glycidyl acrylates, glycidyl methacrylate, allyl glycidyl ether, etc.) to homopolymers or copolymers. Most desirably, epoxy compounds contain, on the average, at least one pendant or terminal 1,2-epoxy group (i.e., vicinal epoxy group) per molecule.

In other embodiments, the solid epoxy resins that may be used in the present invention can preferably comprise or preferably be mainly based upon Bisphenol A—e.g. diglycidyl ether of bisphenol A having the general formula:

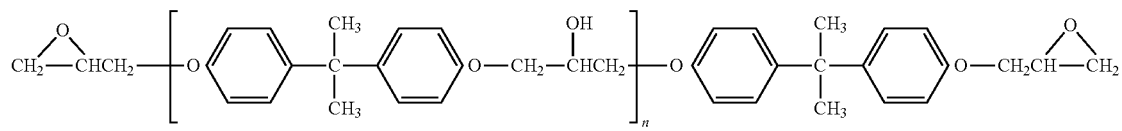

wherein n is 0 to 25.

In some embodiments, the adhesives comprise a basic liquid resin having an epoxy equivalent weight in the range of about 180 to 195 g/mol; alternatively in the range of about 170 to 175 g/mol. Some embodiments provide that combinations of epoxy resins may be used to adjust properties of the epoxy adhesive.

In some embodiments, the second adhesive may also include an epoxy/elastomer adduct. More specifically, some embodiments provide that the adduct may be composed substantially entirely (i.e., at least 70%, 80%, 90% or more) of one or more adducts that are solid at a temperature of 23° C. In some embodiments, the adduct may comprise from about 5% to about 80% by weight of the second adhesive; alternatively at least about 10% by weight of the second adhesive; alternatively at least about 20% by weight of the second adhesive; alternatively less than about 70% by weight of the second adhesive; alternatively less than about 40% by weight of the second adhesive. In some embodiments, the adduct may include about 1:5 to about 5:1 parts of epoxy to elastomer; alternatively from about 1:3 to about 3:1 parts of epoxy to elastomer. In certain embodiments of the present invention, adducts include solid and liquid carboxyl-terminated nitrile rubber, liquid nitrile rubbers that have amine functionality and any elastomer, polysiloxane, epoxidized polysulfide, diisocyanate and any elastomer, plastomer or thermoplastic that can react with epoxy—including carboxyl, amine, isocyanate and maleic anhydride groups.

In some embodiments, the second adhesive may include an elastomer—such as, without limitation, natural rubber, styrene-butadiene rubber, polyisoprene, polyisobutylene, polyvinyl, polybutadiene, isoprene-butadiene copolymer, neoprene, nitrile rubber (e.g., a butyl nitrile, such as carboxy-terminated butyl nitrile (CTBN)), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. Examples of additional or alternative epoxy/elastomer or other adducts suitable for use with the present teachings are disclosed in U.S. Patent Publication 2004/0204551, which is incorporated herein by reference for all purposes. In some embodiments, the epoxy resin may include from about 20% to about 40% by weight CTBN/epoxy adduct.

In some embodiments, the second adhesive may also include one or more additional polymer and/or copolymer materials, such as thermoplastics, elastomers, combinations thereof or the like. In some embodiments, polymers that might be appropriately incorporated into the adhesive include halogenated polymers, core/shell polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

Some embodiments provide that the second adhesive may also include a variety of curing agents and fillers. Examples of suitable curing agents include materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. In some embodiments, an accelerator for the curing agents (e.g., a modified or unmodified urea such as methylene diphenyl bis urea, an imidazole or a combination thereof) may also be provided for preparing the adhesive. In another embodiment, the second adhesive may comprise dihydrazide curing agent, such as isophthalic dihydrazide.

Examples of suitable fillers include silica, MIOX, fumed silica, wollastonite, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the adhesive material in leveling itself during flow of the material. The clays that may be used as fillers may include clays from the kaolinite, illite, chloritem, smecitite or sepiolite groups, which may be calcined. One such filler may include a Garamite® product, available from Southern Clay Products, Inc. of Gonzales, Tex. One or more mineral or stone type fillers such as calcium carbonate, sodium carbonate or the like may be used as fillers. Such mineral fillers may improve the stiffness of the cured adhesive and assist in improving the viscosity of the adhesive to its desired level. Examples of additional suitable fillers include, without limitation, talc, vermiculite, pyrophyllite, sauconite, saponite, nontronite, montmorillonite or mixtures thereof. In another preferred embodiment, silicate minerals such as mica may be used as fillers. Preferably the filler includes a material that is generally non-reactive with the other components present in the activatable material. While the fillers may generally be present within the activatable material to take up space at a relatively low weight, it is contemplated that the fillers may also impart properties such as strength and impact resistance to the activatable material.

In some embodiments, the first adhesive may be selected from "hot-melt" adhesives, "pressure sensitive" adhesives, or a combination thereof. Pressure sensitive adhesives, in some embodiments, are derived from copolymers, such as alkyl acrylate and alkyl methacrylate copolymers that yield soft and tacky polymers having a low Tg—i.e. ranging from about 10° C. to about (−)90° C. In some embodiments, homopolymers do not have the properties required for pressure sensitive adhesives; they are therefore modified by copolymerization with at least a small amount of other co-monomers to form pressures sensitive adhesives. In addition to the comonomer composition required for pressure sensitive adhesives, a significant amount of low molecular weight copolymer has been found to be important in achieving the adhesive properties needed. In some embodiments, chain transfer agents are typically used during the polymerization process to obtain the desired low molecular weight copolymer fraction.

The pressure sensitive adhesive polymer may, in some embodiments, contain various combinations of monomer units such as alkyl(meth)acrylates, vinyl esters, chloroprene, butadiene, and isoprene. In other embodiments, pressure sensitive adhesive polymer dispersions may also include those not made by traditional emulsion polymerization processes, such as natural rubber latex, polyurethane dispersions, and polysiloxane dispersions. In other embodiments, block copolymers may be used in the first adhesive, such as the styrene-isoprene-styrene or styrene-butadiene-styrene polymer offered by Shell Chemical under the Kraton trademark. In some embodiments, block copolymers may be dissolved in a suitable solvent and dispersed in water with subsequent stripping of the solvent.

In some embodiments, appropriate monomers that can be used to produce aqueous based pressure sensitive adhesive polymers include: (meth)acrylic acid, C1 to C8 alkyl (meth) acrylate, C1 to C13 hydroxyalkyl(meth)acrylate, di-C1 to C13 alkyl maleate/fumarate, vinyl ester such as vinyl acetate, styrene, butadiene, 2-chloro-1,3-butadiene, and ethylene. In some embodiments, the aqueous based pressure sensitive adhesive polymers can also be natural rubber, silicone polymers, polyurethanes, and the like. Some embodiments provide pressure sensitive adhesive polymer emulsions having an average particle size of less than about 500 nm; alternatively than about 300 nm. In some embodiments, the pressure sensitive adhesive copolymers are designed to have a Tg of about (−)10° C. to about (−)90° C.; alternatively from about (−)25° C. to about (−)75° C.

In some embodiments, the high and low Tg adhesives have particular benefit for use in a spray or roll coating process. Some embodiments provide that the first and/or second adhesive provides for a desirable viscosity upon heating (e.g. heated rollers) by softening the first and/or second adhesive to make it more fluid-like to allow the adhesive to flow in such a way that it can effectively coat a core substrate without covering the core openings. In some embodiments, the processing temperature of the spray or roll coating process can act to modify the viscosity of the material to enable coating without undesirable dripping or covering of the core cell openings. Low coating temperatures that are too low may result in poor coating due to poor wetting characteristics and/or poor adherance to the core. In other embodiments, the coating temperature cannot be too high, as a crosslinking/curing reaction of the adhesive may be initiated as well as increased fluidity that may lead to the first and/or second adhesive may cover or drip into one or more honeycomb openings during the roll-coating process. In other embodiments, the first or second adhesive may be rolled or sprayed onto the first and/or second facing layers.

During the roll coating process, in some embodiments, the adhesive should have a viscosity that is not so low as to cause the adhesive to drip or present challenges to locating the adhesive onto an edge of a honeycomb structure. In other embodiments, the viscosity of the adhesive cannot be so low that the roll-coating process would cause the adhesive to cover or form a film that at least partially covers one or more honeycomb cells upon locating the adhesive onto an edge of the honeycomb structure. Some embodiments provide that the viscosity cannot be so high as to prevent adhering of the adhesive to the honeycomb. In one embodiment, the viscosity of the adhesive at 8 rad/s may be at least about 500 Pa·s, or at least about 200 Pa·s at 37 rad/s and, at 8 rad/s may be less than about 2500 Pa·s, or less than about 1500 Pa·s at 37 rad/s; alternatively, the viscosity of the adhesive at 8 rad/s may be from about 700 Pa·s to about 2000 Pa·s, and the viscosity of the adhesive at 37 rad/s may be from about 500 Pa·s to about 1500 Pa·s.

In some embodiments, the adhesive may also have a sufficient pot life to prevent premature cure of the adhesive, which may be about 45 minutes. In some embodiments, coating the rolls of the roll coater with the adhesive may take at least about 10 minutes to evenly spread the adhesive along each roll, and cleaning the adhesive from the machine after processing may also take at least about 10 minutes—thus, a processing time of only about 25 minutes may remain for an adhesive having a pot life of about 45 minutes. In other embodiments, an adhesive having a pot life of less than about 45 minutes (depending upon the temperature that the adhesive experiences) may not allow for sufficient processing time to coat a substantial number of panels.

In some embodiments, the temperature of the rolls may also affect pot life of the adhesive; processing temperatures for the roll coating process are generally from about 200° F. to 275° F. In one embodiment, at a coating temperature of about 275° F., the pot life of the adhesive may be about 45 minutes; alternatively when the temperature is reduced to about 260° F., the pot life can be significantly increased, even increased by a factor of two or even greater. In some embodiments, a reduction in the roll coating temperature may also have a deleterious effect on the viscosity (e.g., by increasing the viscosity), therefore a balance exists between pot life and viscosity. In other embodiments, the pot life of the adhesive at about 235° F. may be from about 15 minutes to about 90 minutes; alternatively at least about 30 minutes; alternatively less than about 70 minutes; alternatively from about 40 minutes to about 60 minutes.

In some embodiments, the substrates may be exposed to temperatures in excess of 300° F. and thus the adhesive may be formulated so that it has a glass transition temperature that exceeds the high temperatures to which the adhesive will be exposed to during panel use.

In some embodiments, the sag resistant panels formed of the substrate may have representative thicknesses (i.e. first and second facing layers and core) ranging from about and including 0.375 to 3 inches, with a preferred but non-limiting range of about and including 0.6 to 1.5 inches. Panels of various desired perimetric dimensions (e.g. width and length) may be formed using the substrate. In some embodiments, without limitation, acoustical panels may be 4 ft.×4ft., 4 ft.×8 ft., and 4 ft.×12 ft. with the larger sizes being provided with progressively taller core cell heights to resist sag.

In some embodiments, the sag-resistant substrates may be formed into in a plurality of configurations as desired for a given application sound absorption and aesthetic needs, including for example, without limitation, polygonal, square, ellipsoidal, circle, hexagon, trapezoid, etc., and with various side profiles including flat, convex, concave, and combinations thereof. Accordingly, the invention is not limited by the shape of the acoustical substrate.

In some embodiments, the present invention provides a substrate comprising: a core comprising a plurality of open cells; a first facing layer attached to a first major side of the core by a first adhesive; and a second facing layer attached to a second major side of the core by a second adhesive; wherein the glass transition temperature of the second adhesive is greater than the glass transition temperature of the first adhesive.

In some embodiments, the first adhesive is selected from a polyurethane, a polyolefin, a polyester, and a combination of two more thereof. In some embodiments, the second adhesive is selected from an epoxy resin, a polyurethane, a polyolefin, a polyester, and a combination of two more thereof.

In some embodiments, the core is formed from 20 to 80 pound Kraft paper. In some embodiments, the core is treated with a phenolic resin. In other embodiments, the core is formed from fiberglass or aluminum.

In some embodiments, the open cells of the core are honeycomb shaped. In some embodiments, the open cells of the core are triangular shaped. In some embodiments, the open cells create an open volume that accounts for at least about 90% of the total volume occupied by the core.

In some embodiments, the first facing layer is selected from the group consisting of a woven glass scrim, paper sheet, or polymer film.

In some embodiments, the open cells of the core are substantially free of the first adhesive. In some embodiments, the open cells of the core are substantially free of the second adhesive.

Some embodiments provide a method for producing a substrate comprising: forming a core having a plurality of open cells; forming a first facing layer; forming a second facing layer; and attaching the first facing layer to a first major side of the core using a first adhesive and attaching the second facing layer to a second major side of the core using a second adhesive; wherein the glass transition temperature of the second adhesive is greater than the glass transition temperature of the first adhesive.

In some embodiments, the first adhesive is applied to the first major side of the core by spray, roller, brush, or dipping. In some embodiments, the first adhesive is applied to the first facing layer by spray, roller, brush, or dipping.

In other embodiments, the second adhesive is applied to the second major side of the core by spray, roller, brush, or dipping. In further embodiments, the second adhesive is applied to the second facing layer by spray, roller, brush, or dipping.

In some embodiments, the first adhesive is applied prior to application of the second adhesive. In some embodiments, the first facing layer is adhered to the core before the second facing layer is adhered to the core.

In some embodiments, the second adhesive is post-treated by heat, UV radiation, or pressure.

The invention will be described in greater detail by way of specific examples. The following examples are offered for illustrative purposes and are not intended to limit the invention in any manner. Those skilled in the art will readily recognize a variety of noncritical parameters, which can be changed or modified to yield essentially the same results.

EXAMPLES

Example 1

A prefinished facing layer is placed finished side down onto a smooth flat work surface. A first adhesive is applied to the edge of a honeycomb core material. The expanded honeycomb is then placed on a first facing layer such that the first adhesive is in contact with the non-finished side of the first facing layer. A flat weighted plate is then placed on the open cell (top side) of the expanded honeycomb to ensure good contact pressure with the first adhesive and allowed to set overnight. The weighted plate is then removed and a second adhesive is applied to onto the open cell honeycomb using a roller. A second prefinished facing layer is then placed on top of the second adhesive, with its finished side facing outward away from the core. The flat weighted plate is then repositioned over the assembly and the second adhesive is allowed to set overnight. The substrates are then trimmed to a two (2) foot by four (4) foot size for sag resistance testing. A similar procedure can be used to make arches, serpentines and other three dimensional shapes; however in this circumstance, the prefinished facing is placed in a form or contoured mold, and instead of a flat weighted plate a weighted rubber mat is used to ensure uniform pressure while the adhesives set.

Example 2

Long term mechanical stability, or sag resistance, of the materials used to create ceiling systems are evaluated using a programmable environmental chamber. Sample structures are placed in the chamber and supported on their edges by a rigid frame. The chamber is kept at a constant 82° F. (27.8° C.) and the relative humidity is cycled between 35% and 90%. The cycles are 24 hours in length and 4 cycles constitute a complete test. The vertical deflection or sag at the center of the panel is the measure of quality. A smaller (in absolute value) deflection equates to better long term stability.

TABLE 1

| Example | First Adhesive | Second Adhesive | Sag (mils) |
| --- | --- | --- | --- |
| 1 | Hard Set | Hard Set | (−)43 |
| 2 | Hard Set | Hard Set | (−)152 |
| 3 | Hard Set | Hard Set | (−)66 |
| 4 | Soft Set | Soft Set | (−)589 |
| 5 | Soft Set | Soft Set | (−)1000 |
| 6 | Soft Set | Soft Set | (−)1000 |
| 7 | Hard Set | Soft Set | (−)503 |
| 8 | Hard Set | Soft Set | (−)560 |
| 9 | Soft Set | Hard Set | (−)136 |

The $T_g$ of the Hard Set Adhesive was 37° C. and the $T_g$ of the Soft Set adhesive was (−)9° C.

The results described in Table 1 (above) demonstrate that the inventive combination of first and second adhesives provide the desired dimensional stability.

Example 3

The manufacturing, transportation and installation of a building material will often require that it be lifted or flipped in order to properly orient it or change its position. This handling can place unbalanced stresses on the materials. The larger the size of the panel, the more difficult it can be for one or even multiple individuals to avoid subjecting the product to such unbalanced forces. A four (4) foot by eight (8) foot panel was prepared using a hard set adhesive to bond non-woven fiberglass facing layers onto a honeycomb paper core with a cell height of 1 inch and cell size of 1 inch. The hard set adhesive has a $T_g$ of 61° C. When the panels are lifted for installation as part of a suspended ceiling system, the panels are flexed slightly, breaking the bonds between the core and the facing layer in localized regions of the substrate. Although the overall panel is dimensionally stable and does not sag, the localized delamination results in a visual defect which is unacceptable to customers. When a similar panel was made using a soft set adhesive with a $T_g$ of (−)40° C. to bond one facing layer to the core and a hard set adhesive to bond the opposite face to the core, the panel is handled and installed without damage.

The results of the experiments described in Examples 2 and 3, demonstrate that the inventive combination of first and second adhesives provide the desired dimensional stability and resistance to fracture upon impact, while the comparative adhesive systems either provide insufficient sag resistance or are too brittle to manufacture, transport and/or install.

It is intended that any patents, patent applications or printed publications, including books, mentioned in this patent document be hereby incorporated by reference in their entirety.

As those skilled in the art will appreciate, numerous changes and modifications may be made to the embodiments described herein, without departing from the spirit of the invention. It is intended that all such variations fall within the scope of the invention.

The invention claimed is:

1. A substrate comprising:
   a core comprising a plurality of open cells;
   a first facing layer attached to a first major side of the core by a first adhesive; and
   a second facing layer attached to a second major side of the core by a second adhesive;
   wherein the glass transition temperature of the second adhesive is greater than the glass transition temperature of the first adhesive.

2. The substrate of claim 1, wherein the first adhesive has a glass transition temperature of from about (−)60 ° C. to about 0 ° C.

3. The substrate of claim 1, wherein the second adhesive has a glass transition temperature of from about 40 ° C. to about 100 ° C.

4. The substrate of claim 1, wherein the second adhesive has a glass transition that is about 40 ° C. to about 140 ° C. greater than the glass transition temperature of the first adhesive.

5. The substrate of claim 1, wherein the second adhesive comprises a thermoset polymer selected from an epoxy resin, a polyurethane, a polyolefin, a polyester, and a combination of two more thereof.

6. The substrate of claim 1, wherein the first adhesive comprises a thermoplastic polymer selected from a polyurethane, a polyolefin, a polyester, and a combination of two more thereof.

7. The substrate of claim 1, wherein the core is formed from 20 to 80 pound kraft paper.

8. The substrate of claim 1, wherein the core is formed from fiberglass or aluminum.

9. The substrate of claim 1, wherein the first facing layer is selected from the group consisting of a woven glass scrim, non-woven glass scrim, paper sheet, or polymer film.

10. The substrate of claim 1, wherein the open cells of the core are substantially free of the first adhesive.

11. The substrate of claim 1, wherein the open cells of the core are substantially free of the second adhesive.

12. A method for producing a substrate comprising:
   i) forming a core having a plurality of open cells;
   ii) forming a first facing layer;
   iii) forming a second facing layer; and
   iv) attaching the first facing layer to a first major side of the core using a first adhesive and attaching the second facing layer to a second major side of the core using a second adhesive;
   wherein the glass transition temperature of the second adhesive is greater than the glass transition temperature of the first adhesive.

13. The method of claim 12, wherein the first adhesive is applied to the first major side of the core or the first facing layer by spray, roller, brush, or dipping.

14. The method of claim 12, wherein the second adhesive is applied to the second major side of the core or the second facing layer by spray, roller, brush, or dipping.

15. The method of claim 14, wherein the first adhesive is applied prior to application of the second adhesive.

16. The method of claim 12, wherein the first facing layer is adhered to the core before the second facing layer is adhered to the core.

17. The method of claim 12, wherein the second adhesive is post-treated by heat, UV radiation, or pressure.

18. The method of claim 12, wherein the first adhesive has a glass transition temperature of from about (−)60 ° C. to about 0 ° C.

19. The method of claim 12, wherein the second adhesive has a glass transition temperature of from about 40 ° C. to about 100 ° C.

20. The method of claim 12, wherein the second adhesive, has a glass transition temperature that is about 40 ° C. to about 140 ° C. greater than the glass transition temperature of the first adhesive.

* * * * *